United States Patent
Lee et al.

(10) Patent No.: US 12,439,828 B2
(45) Date of Patent: Oct. 7, 2025

(54) SPIN-ORBIT TORQUE DEVICE AND MANUFACTURING METHOD THEREOF

(71) Applicants: HYUNDAI MOTOR COMPANY, Seoul (KR); KIA CORPORATION, Seoul (KR); KOREA ADVANCED INSTITUTE OF SCIENCE AND TECHNOLOGY, Daejeon (KR)

(72) Inventors: Ji-Sung Lee, Suwon-si (KR); Joon-Hyun Kwon, Hwaseong-si (KR); Su-Jung Noh, Seoul (KR); Han-Saem Lee, Seoul (KR); Byong-Guk Park, Daejeon (KR); Jaimin Kang, Daejeon (KR); Jeong-Mok Kim, Daejeon (KR); Soogil Lee, Daejeon (KR)

(73) Assignees: HYUNDAI MOTOR COMPANY, Seoul (KR); KIA CORPORATION, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 593 days.

(21) Appl. No.: 17/677,078

(22) Filed: Feb. 22, 2022

(65) Prior Publication Data
US 2023/0096447 A1   Mar. 30, 2023

(30) Foreign Application Priority Data
Sep. 30, 2021   (KR) .......................... 10-2021-0129677

(51) Int. Cl.
*H01L 43/08*   (2006.01)
*G11C 11/16*   (2006.01)
(Continued)

(52) U.S. Cl.
CPC ........... *H10N 50/10* (2023.02); *G11C 11/161* (2013.01); *H01F 10/3286* (2013.01);
(Continued)

(58) Field of Classification Search
CPC ...................................................... H10N 50/10
See application file for complete search history.

(56) References Cited

U.S. PATENT DOCUMENTS

| 6,383,668 B1 * | 5/2002 | Fullerton ............... G11B 5/678 |
| | | 428/828 |
| 10,127,956 B2 | 11/2018 | Lee et al. |

(Continued)

FOREIGN PATENT DOCUMENTS

| CN | 108011038 A | 5/2018 |
| CN | 108321292 A * | 7/2018 ............. H10N 52/00 |

(Continued)

*Primary Examiner* — Peter Bradford
(74) *Attorney, Agent, or Firm* — MCDONNELL BOEHNEN HULBERT & BERGHOFF LLP

(57) ABSTRACT

Disclosed herein is a spin-orbit torque device including a lower ferromagnetic layer, a non-magnetic layer bonded to the lower ferromagnetic layer, and an upper ferromagnetic layer bonded to the non-magnetic layer, wherein a magnetization orientation of the lower ferromagnetic layer is randomly distributed. According to the present disclosure, it is possible to provide a magnetic memory device which cannot be physically duplicated and has reconfigurability using a spin-orbit torque.

12 Claims, 29 Drawing Sheets

(51) Int. Cl.
- *H01F 10/32* (2006.01)
- *H01L 27/22* (2006.01)
- *H01L 43/10* (2006.01)
- *H01L 43/12* (2006.01)
- *H10B 61/00* (2023.01)
- *H10N 50/01* (2023.01)
- *H10N 50/10* (2023.01)
- *H10N 50/85* (2023.01)

(52) U.S. Cl.
CPC ............ *H10B 61/00* (2023.02); *H10N 50/01* (2023.02); *H10N 50/85* (2023.02)

(56) References Cited

U.S. PATENT DOCUMENTS

| | | |
|---|---|---|
| 10,199,574 B2 | 2/2019 | Whig et al. |
| 10,347,828 B2 | 7/2019 | Whig et al. |
| 2012/0251845 A1* | 10/2012 | Wang ................... G11B 5/676 |
| | | 428/827 |
| 2015/0071432 A1* | 3/2015 | Zhu ........................ G09C 1/00 |
| | | 365/158 |
| 2017/0316813 A1 | 11/2017 | Lee et al. |
| 2018/0123024 A1 | 5/2018 | Sasaki et al. |
| 2019/0386207 A1 | 12/2019 | Sasaki et al. |
| 2020/0106002 A1* | 4/2020 | Song ..................... H10N 50/85 |
| 2021/0142157 A1 | 5/2021 | Sengupta et al. |
| 2022/0231867 A1* | 7/2022 | Lee ......................... G11C 7/24 |

FOREIGN PATENT DOCUMENTS

| | | | | |
|---|---|---|---|---|
| CN | 111370573 A | * | 7/2020 | ......... G11C 11/1675 |
| CN | 112701214 A | | 4/2021 | |
| CN | 115994390 A | * | 4/2023 | ............ G06F 21/73 |
| KR | 2016-0133821 A | | 11/2016 | |
| KR | 10-1981449 B1 | | 5/2019 | |

* cited by examiner

@ $T > T_b$ (BLOCKING TEMPERATURE OF ANTIFERROMAGNETIC LAYER)

Easy axis: as-deposited

MOKE microscope image

SPIN-ORBIT TORQUE DEVICE AND MANUFACTURING METHOD THEREOF

CROSS REFERENCE TO RELATED APPLICATIONS

This application claims priority to Korean Patent Application No. 10-2021-0129677, filed on Sep. 30, 2021, which is incorporated herein by reference in its entirety.

BACKGROUND

Field of Present Disclosure

Exemplary embodiments of the present disclosure relate to a magnetic device using a spin-orbit torque and a manufacturing method thereof.

Description of Related Art

With the expansion of electrical and electronic parts of a vehicle, vehicle driving is rapidly changing to electronic drive-by-wire beyond the existing mechanical operation, and thus a security issue of internal electrical and electronic parts of the vehicle is becoming an important issue.

With the development of information and communication technology such as Internet of things (IoT), ahead of a mass production of autonomous vehicles, a security problem of an autonomous driving system of the vehicle is emerging in a vehicle to everything (V2X) situation. When the autonomous driving system is not reliably protected from external attacks, a fatal threat to the lives of occupants or pedestrians may occur.

In order to respond to the above security problem, a hardware-based security solution beyond stability of the existing software-based security solution is recently starting to get attention.

The present disclosure relates to a memory device capable of being the key to such a security problem.

FIGS. 1 to 3 illustrate examples of the conventional physically unclonable functions (PUF) memory device.

FIG. 1 show a technique for securing randomness of an electrical contact by adjusting a via-hole etching process for manufacturing a metal electrode during a semiconductor process to randomize a size of a via-hole.

This secures uniqueness, randomness, and excellent repeatability (reliability) which are not changed according to environments (a temperature, humidity, and the like). In addition, data encrypted with a via PUF key cannot be decrypted without the VIA PUF key.

However, there is a limit that reconfigurability is not secured.

FIG. 2 illustrates a so-called spin transfer torque magnetic tunnel junction (MTJ)-based PUF. The PUF is implemented such that two MTJ devices are connected using one current line, an overcurrent flows to cause breakdown (BD) of the two MTJ devices, and then a phenomenon in which the BD randomly occurs in the right and left MTJ devices.

When the BD occurs in one of the two MTJ devices, since a portion in which the BD occurs is irreversible even in the next operation, an ideal situation in which an intra-die HD is 0% is achieved and it is random which portion undergoes the BD so that the intra-die HD is also high.

However, this also has a limit that reconfigurability is not secured.

FIG. 3 illustrates a perpendicular magnetic anisotropy-based PUF. The PUF is implemented such that, in Ta (10 nm)/CoFeB (1.6 nm)/MgO (1.6 nm)/Ta (5 nm) structure, the uppermost Ta (5 nm) capping layer is etched to allow the MgO layer to have a non-uniform thickness (ranging from 0.6 nm to 0.8 nm), thereby adjusting a perpendicular magnetic anisotropy effect of a CoFeB/MgO interface which generates perpendicular magnetization, and when an external magnetic field is zero, a difference in values of anomalous Hall resistance of the CoFeB layers is read.

Thus, it is possible to secure a PUF characteristic which is not sensitive to environments (a temperature, radiation, and the like). However, a separate process and a separate circuit separate, which convert an anomalous Hall signal into a digital output, is required, and this also has a limit in which reconfigurability is not secured.

The contents described in the above Description of Related Art are to aid understanding of the background of the present disclosure and may include what is not previously known to those skilled in the art to which the present disclosure pertains.

SUMMARY

An embodiment of the present disclosure is directed to a magnetic memory device which is impossible to be physically replicated using a spin-orbit torque and has reconfigurability, and a method of manufacturing a spin-orbit torque device.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, there is provided a spin-orbit torque device including a lower ferromagnetic layer, a non-magnetic layer bonded to the lower ferromagnetic layer, and an upper ferromagnetic layer bonded to the non-magnetic layer, wherein a magnetization orientation of the lower ferromagnetic layer is randomly distributed.

In addition, the lower ferromagnetic layer may be demagnetized.

In addition, a switching polarity of the upper ferromagnetic layer may be determined according to a random magnetization orientation of the lower ferromagnetic layer.

Here, the lower ferromagnetic layer may have horizontal anisotropy, and the upper ferromagnetic layer may have perpendicular anisotropy.

In addition, each of the upper ferromagnetic layer and the lower ferromagnetic layer may be any one among a CoFeB alloy, a CoFe alloy, and a NiFe alloy.

In addition, the non-magnetic layer may be any one of titanium (Ti) and tantalum (Ta).

In accordance with another embodiment of the present disclosure, there is provided a spin-orbit torque device including an antiferromagnetic layer, a lower ferromagnetic layer bonded to the antiferromagnetic layer, a non-magnetic layer bonded to the lower ferromagnetic layer, and an upper ferromagnetic layer which is bonded to the non-magnetic layer and which has perpendicular anisotropy, wherein a magnetization orientation of the lower ferromagnetic layer is randomly distributed, and exchange coupling anisotropy is formed between the antiferromagnetic layer and the lower ferromagnetic layer.

In addition, the lower ferromagnetic layer may be demagnetized.

In addition, a switching polarity of the upper ferromagnetic layer may be determined according to a random magnetization orientation of the lower ferromagnetic layer.

Here, each of the upper ferromagnetic layer and the lower ferromagnetic layer may be any one among a CoFeB alloy, a CoFe alloy, and a NiFe alloy, and the antiferromagnetic layer may be any one of IrMn and PtMn.

Next, in accordance with still another embodiment of the present disclosure, there is provided a method of manufacturing a spin-orbit torque device, which includes preparing a spin-orbit torque device, and demagnetizing a lower ferromagnetic layer of the spin-orbit torque.

In addition, the demagnetizing of the lower ferromagnetic layer may include heating the spin-orbit torque device, and applying a magnetic field to the spin-orbit torque device.

In addition, the heating of the spin-orbit torque device may include heating the lower ferromagnetic layer at a temperature that is greater than or equal to a Neel temperature of the lower ferromagnetic layer.

In addition, the applying of the magnetic field may include alternating and applying a magnetic field to the spin-orbit torque device in an orientation opposite to a forward orientation by gradually reducing a magnitude of the magnetic field.

DETAILED DESCRIPTION

In order to fully understand the present disclosure and operational advantages of the present disclosure and objects attained by practicing the present disclosure, reference should be made to the accompanying drawings that illustrate exemplary embodiments of the present disclosure and to the description in the accompanying drawings.

In describing exemplary embodiments of the present disclosure, known technologies or repeated descriptions may be reduced or omitted to avoid unnecessarily obscuring the gist of the present disclosure.

Among recent semiconductor devices, since a magnetic memory device has a high speed, a low operating voltage, and a non-volatile characteristic, the magnetic memory device has an ideal condition as a memory device.

The magnetic memory device has a magnetic tunnel junction (MTJ) structure in which two ferromagnetic materials are separated by an insulating layer. Thus, information is stored using magnetoresistance which is varied according to relative magnetization orientations of the two magnetic materials.

A magnetization orientation of the two magnetic layers may be controlled by a spin polarization current, and this is referred to as a spin transfer torque in which an angular momentum of an electron is transferred to a magnetic moment to generate a torque.

In order to control the magnetization orientation using the spin transfer torque, the spin polarization current should pass through the magnetic material. Recently, a technology for placing a heavy metal, which generates a spin current, adjacent to the magnetic material and applying a horizontal current to the magnetic material, thereby achieving a magnetic switching of the magnetic material, that is, a spin-orbit torque technology, has been proposed.

The present disclosure relates to a magnetic memory device which is impossible to be physically duplicated so as to be usable in a security technology using such a spin-orbit torque.

Figure 1:
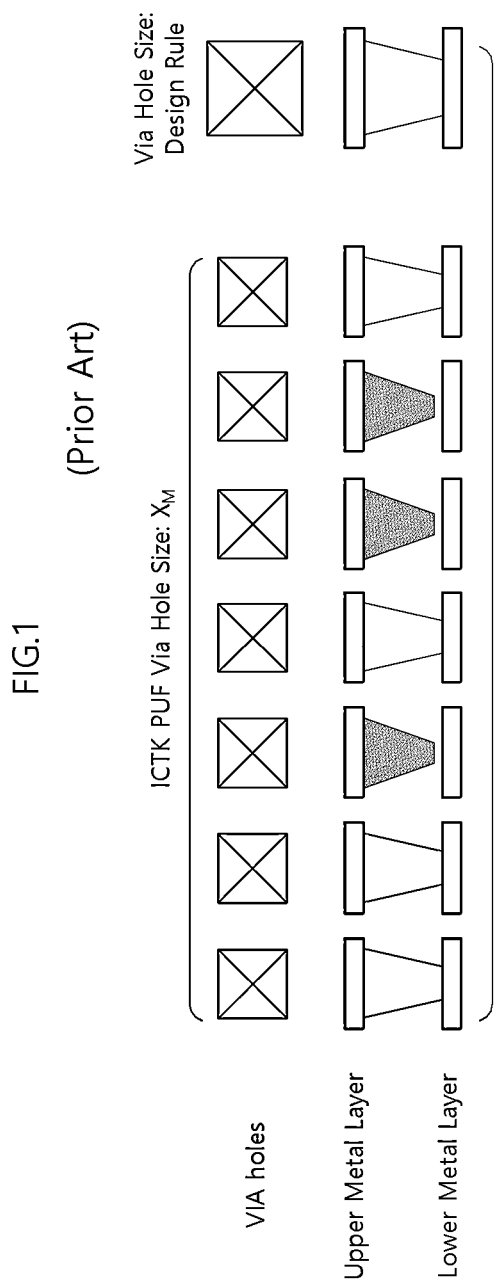
FIGS. 1, 2, and 3 are diagrams illustrating examples of a magnetic memory device according to the related art.
Figure 2:
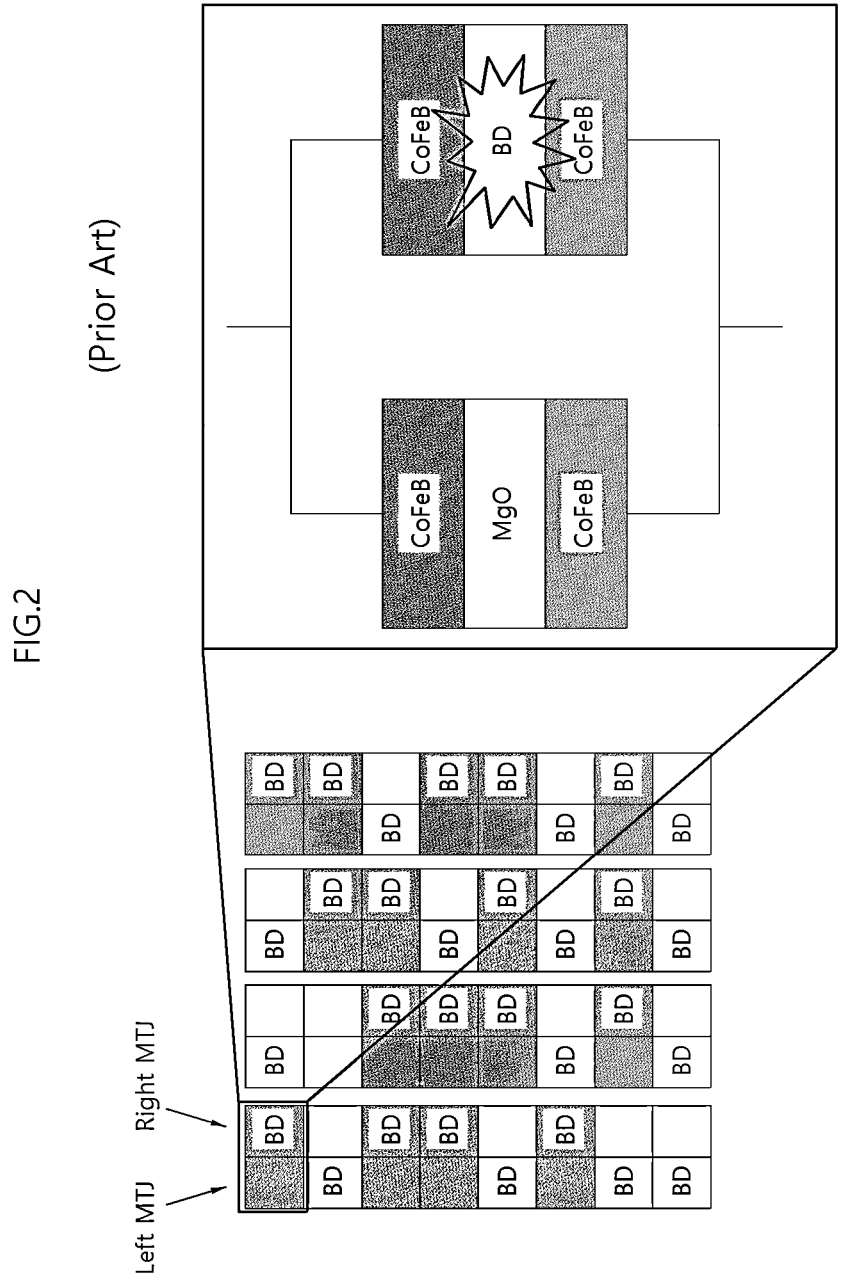
Figure 3:
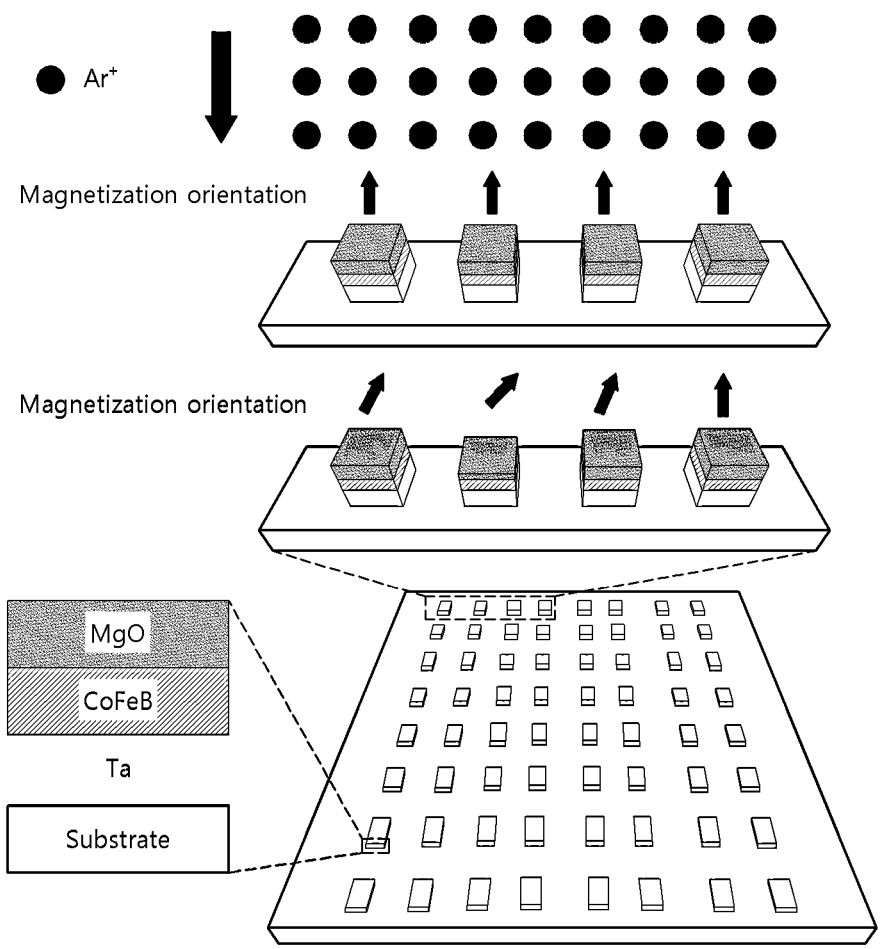
Figure 4:
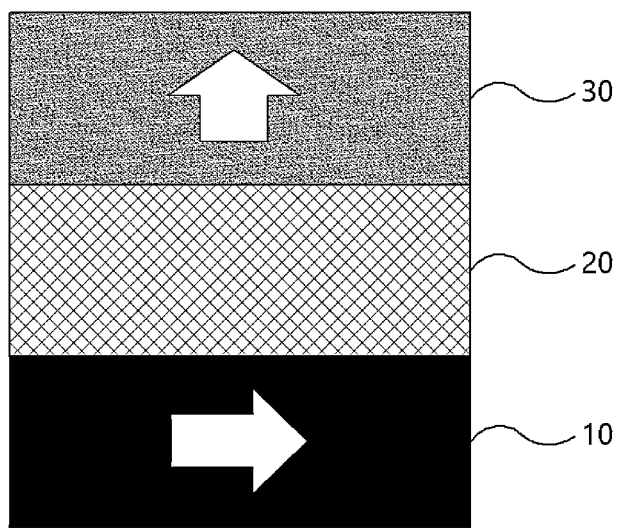
FIG. 4 is a schematic diagram illustrating an example of a spin-orbit torque device according to the present disclosure.

As shown in FIG. 4, a spin-orbit torque device of the present disclosure is formed in a triple-layered structure of a lower ferromagnetic layer 10, a non-magnetic layer 20 bonded to the lower ferromagnetic layer 10, and an upper ferromagnetic layer 30 bonded to the non-magnetic layer 20, the lower ferromagnetic layer 10 may have horizontal anisotropy, and the upper ferromagnetic layer 30 may have a perpendicular anisotropy.

The lower ferromagnetic layer 10 having the horizontal anisotropy may be CoFeB, CoFe, NiFe, or the like, the non-magnetic layer 20 may be titanium (Ti), tantalum (Ta), or the like, and the upper ferromagnetic layer 30 having the perpendicular anisotropy may be an alloy of CoFeB, CoFe, and NiFe.

That is, the lower ferromagnetic layer 10 may be all ferromagnetic material including one among Co, Fe, and Ni, and the non-magnetic layer 20 may be a non-magnetic metal in addition to Ti and Ta.

Here, the present disclosure is characterized in that the magnetization orientation of the lower ferromagnetic layer 10 having the horizontal anisotropy is randomly distributed.

Therefore, the present disclosure relates to the magnetic memory device in which the switching orientation according to the SOT is determined according to the magnetization orientation of the upper ferromagnetic layer 30 having the perpendicular anisotropy due to the random magnetization distribution of the lower ferromagnetic layer 10 having the horizontal anisotropy.

In order to generate a random magnetization orientation distribution, an external magnetic field is applied to a physically and chemically continuous magnetic thin film by alternately changing an orientation and reducing a magnitude of the external magnetic field so that a final magnetic field may become zero and may be demagnetized.

Alternatively, in order to secure thermal stability and stability against the external magnetic field of the lower ferromagnetic layer 10 having the horizontal anisotropy, instead of the above description, a structure in which an antiferromagnetic layer and a ferromagnetic layer are bonded is formed so that exchange coupling anisotropy formed between the antiferromagnetic layer and the ferromagnetic layer may be applied. In this case, randomness that is the same as that of a lower horizontal anisotropic ferromagnetic layer may be obtained.

In this case, the antiferromagnetic layer may be formed of IrMn or PtMn, and in addition to IrMn or PtMn, an antiferromagnetic material, such as FeMn, CoO, or NiO which is capable of generating exchange coupling anisotropy, is also possible.

According to the present disclosure, by using the lower ferromagnetic layer 10 or the embodiment of an antiferromagnetic layer and a ferromagnetic layer instead of the lower ferromagnetic layer 10, a device which reads the randomly distributed magnetization orientation through an electrical or optical method may be implemented. The device may be applied to various devices (an MTJ-based magnetic random access memory (MRAM) device and the like) including a PUF security device.

According to the present disclosure, in the triple-layered structure or the structure to which the antiferromagnetic layer is added, which is described above, a junction body is heated at a temperature (a blocking temperature or a Neel temperature) or higher at which the exchange coupling anisotropy of the lower antiferromagnetic layer and the ferromagnetic layer disappears, and a demagnetization process of alternately applying a magnetic field at the blocking temperature or higher so that a random magnetization arrangement of the lower horizontally magnetized ferromagnetic layer is formed. Alternatively, demagnetization may be performed by ion irradiation.

Therefore, by cooling the junction body at the blocking temperature or lower, a random distribution of the exchange coupling anisotropy following the random magnetization arrangement of the horizontally magnetized ferromagnetic layer is secured. In this case, an SOT switching polarity of the upper ferromagnetic layer having the perpendicular anisotropy is determined according to the magnetization orientations of the lower exchange magnetic coupling anisotropy and the horizontally magnetized ferromagnetic layer.

Hereinafter, an experiment for confirming the exchange coupling anisotropy of the double-layered structure of the IrMn antiferromagnetic layer and the NiFe ferromagnetic layer instead of the lower ferromagnetic layer having the horizontal magnetic anisotropy and the blocking temperature (a temperature at which Neel vector anisotropy of the antiferromagnetic layer disappears) will be described, the demagnetization process is performed on the double-layered structure of the IrMn antiferromagnetic layer and the NiFe ferromagnetic layer to form a random magnetization arrangement and the random magnetization arrangement is confirmed using a magneto-optic Kerr effect (MOKE), and in the triple-layered structure in which a Ta non-magnetic layer of and the CoFeB ferromagnetic layer are bonded to the lower ferromagnetic layer (double layer), the random magnetization arrangement of the lower NiFe ferromagnetic layer is confirmed through an SOT switching experiment of an upper CoFeB ferromagnetic layer structure.

Figure 5:
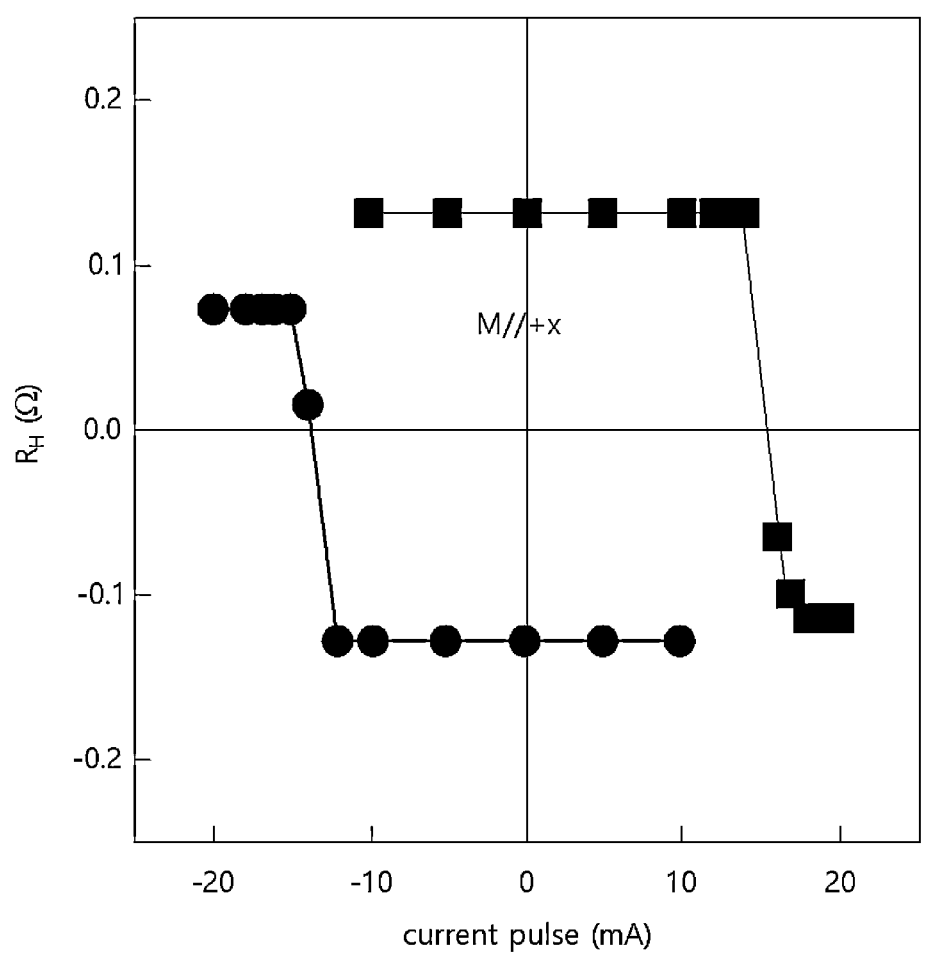
FIG. 5 is a diagram illustrating a magnetoresistance distribution according to an applied current.
Figure 6:
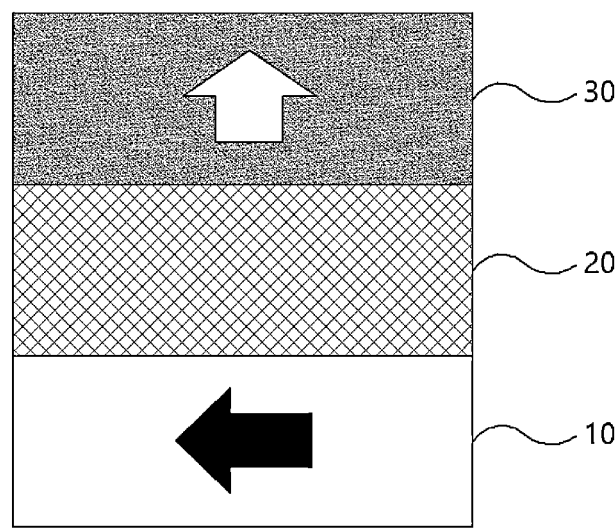
FIG. 6 is a diagram illustrating a state in which a spin-orbit torque (SOT) switching is impossible due to a lower ferromagnetic layer.

According to the present disclosure, whether to switch is determined according to the magnetization orientation or the distribution of the lower ferromagnetic layer 10 having the horizontal magnetic anisotropy. FIG. 4 illustrates a state in which an SOT switching is possible, a magnetoresistance distribution as shown in FIG. 5 may appear according to an applied current, and FIG. 6 illustrates a state in which the SOT switching is not possible.

Figure 7:
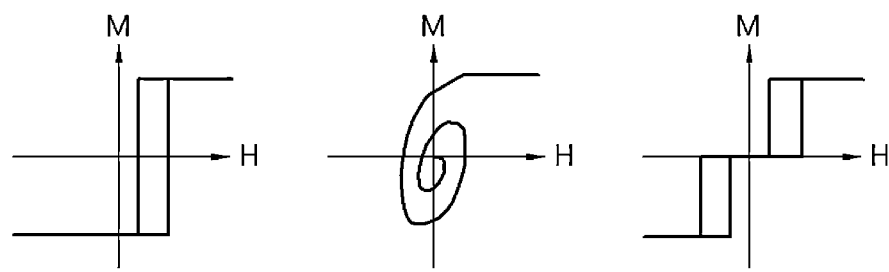
FIG. 7 shows M-H curves according to a demagnetization process of a magnetic material.

FIG. 7 shows M-H curves according to a demagnetization process of a magnetic material. By using the M-H curves, the above-described triple-layered spin-orbit torque device is manufactured and used as a PUF device. In addition, through a structure of an antiferromagnetic layer (AFM) and a ferromagnetic layer (FM) instead of the lower ferromagnetic layer, stability with respect to an external magnetic field may be secured.

First, in order for demagnetization of the double-layered structure of the IrMn antiferromagnetic layer and the NiFe ferromagnetic layer, 1) a holder supporting a sample specimen is heated at the blocking temperature of the antiferromagnetic layer or higher, 2) the sample is heated in the holder for thirty seconds, and 3) the demagnetization process is performed for thirty seconds.

The blocking temperature of the antiferromagnetic layer is, for example, 150° C., and the demagnetization process is performed until a magnetic field becomes zero by alternating an orientation of the magnetic field in a forward orientation and an opposite orientation and sequentially reducing a magnitude of the magnetic field.

Next, the sample is cooled and then measured through a vibrating sample magnetometer (VSM).

Figure 8:
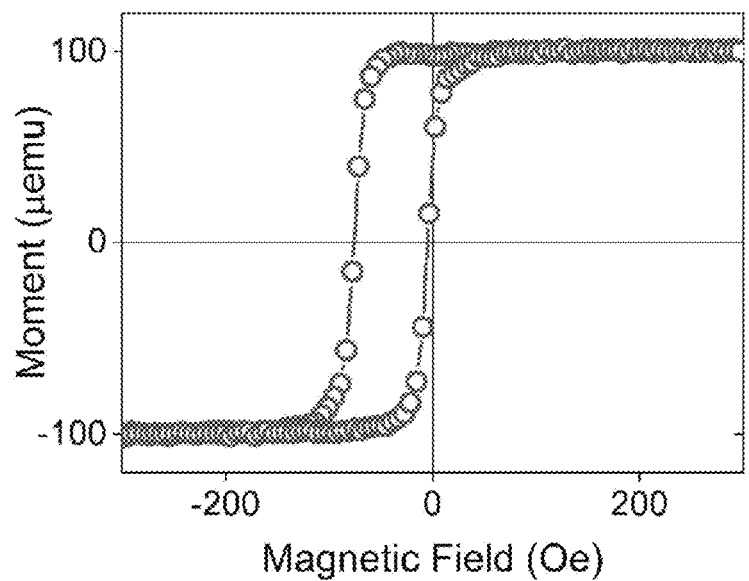
FIG. 8 is a diagram illustrating a magnetic moment state before demagnetization with respect to an easy axis (as-deposited).
Figure 9:
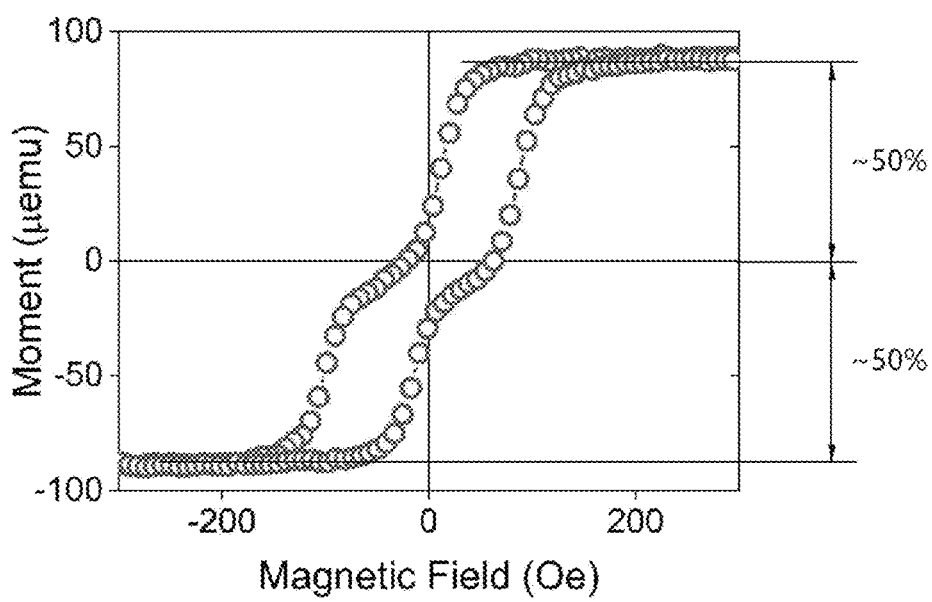
FIG. 9 is a diagram illustrating a distribution after demagnetization.
Figure 10:
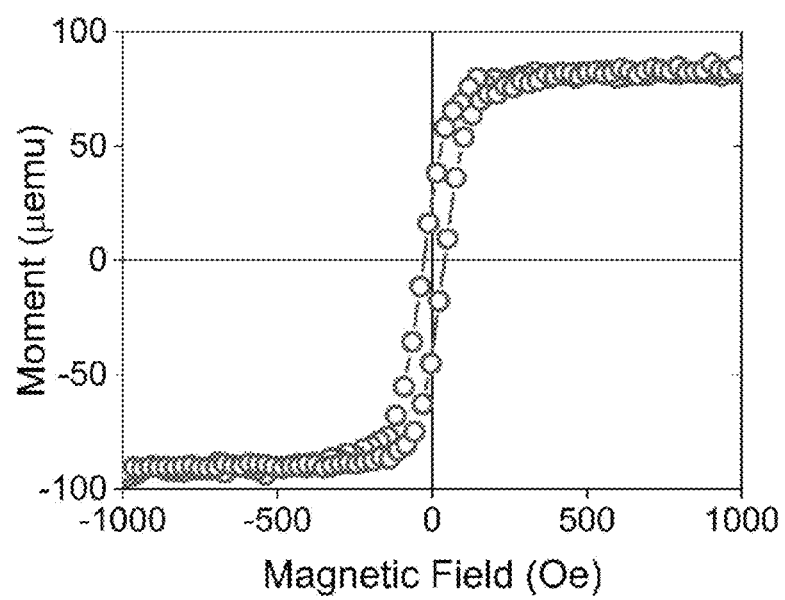
FIG. 10 is a diagram illustrating a demagnetization distribution in the case of a hard axis.

In a magnetic moment state before demagnetization with respect to the easy axis (as-deposited) of FIG. 8, it can be seen that, after the demagnetization, the distribution as shown in FIG. 9 appears, and in the case of the hard axis, a magnetic moment is demagnetized as shown in FIG. 10. As shown in the drawings, it can be seen that an exchange orientation is formed such that (−) is 50% and (+) is 50%.

Figure 11:
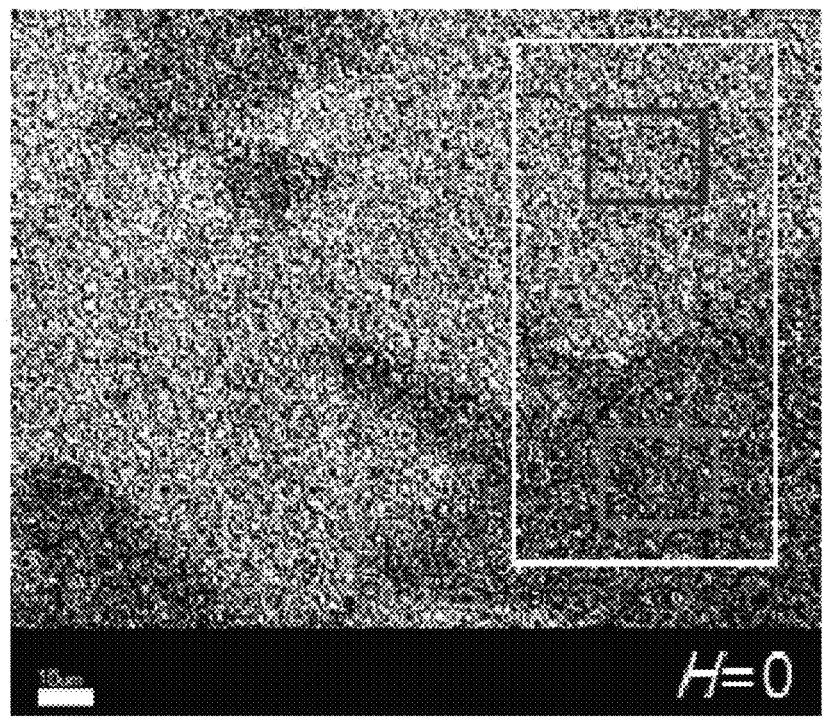
FIG. 11 is diagram illustrating a result in which a random magnetization arrangement is confirmed using a magneto-optic Kerr effect (MOKE).
Figure 12:
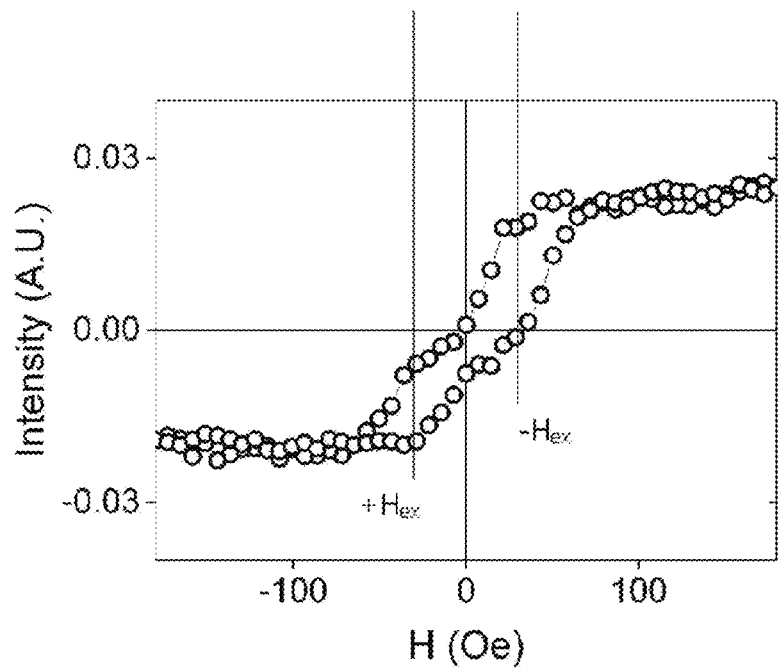
FIG. 12 is a diagram illustrating a white box of FIG. 11.
Figure 13:
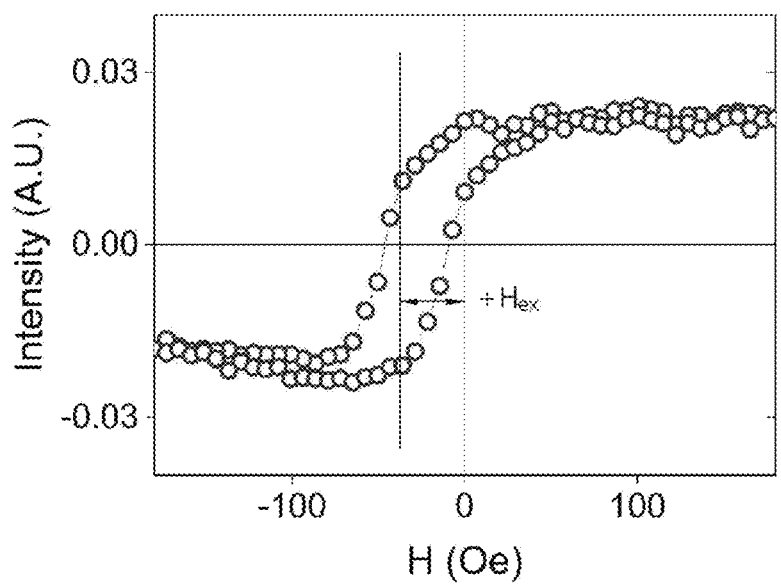
FIG. 13 is a diagram illustrating a blue box of FIG. 11.
Figure 14:
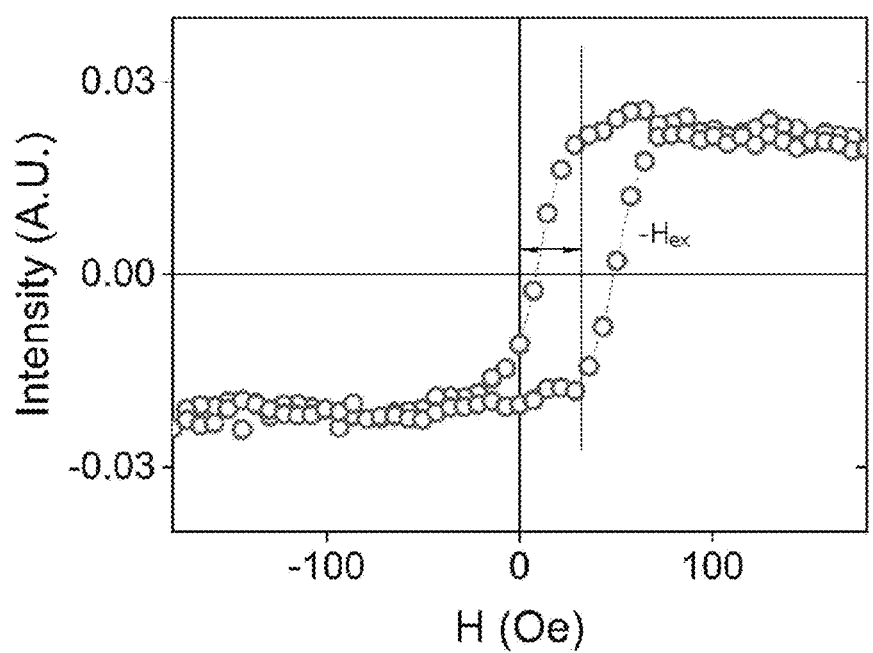
FIG. 14 is a diagram illustrating a red box of FIG. 11.
Figure 15:
FIGS. 15, 16, 17, and 18 illustrate results obtained by more finely observing FIG. 11.
Figure 16:
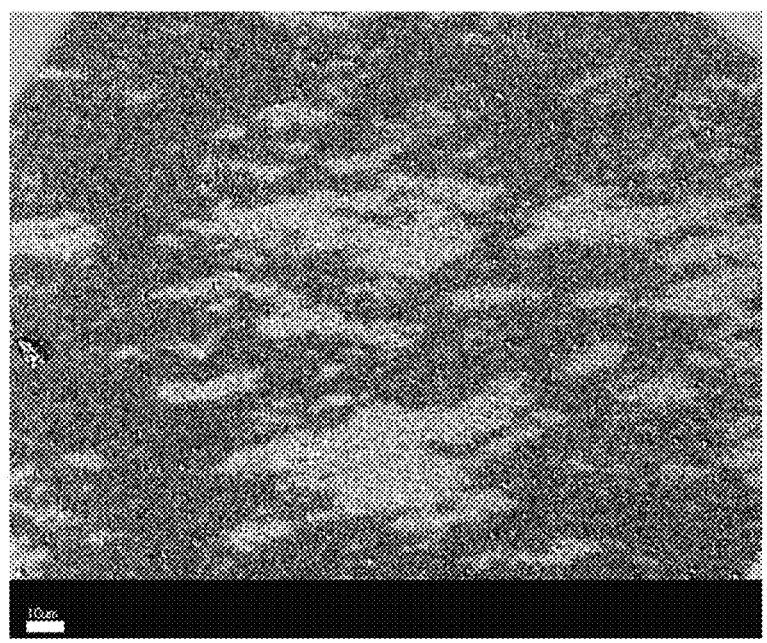
Figure 17:
Figure 18:
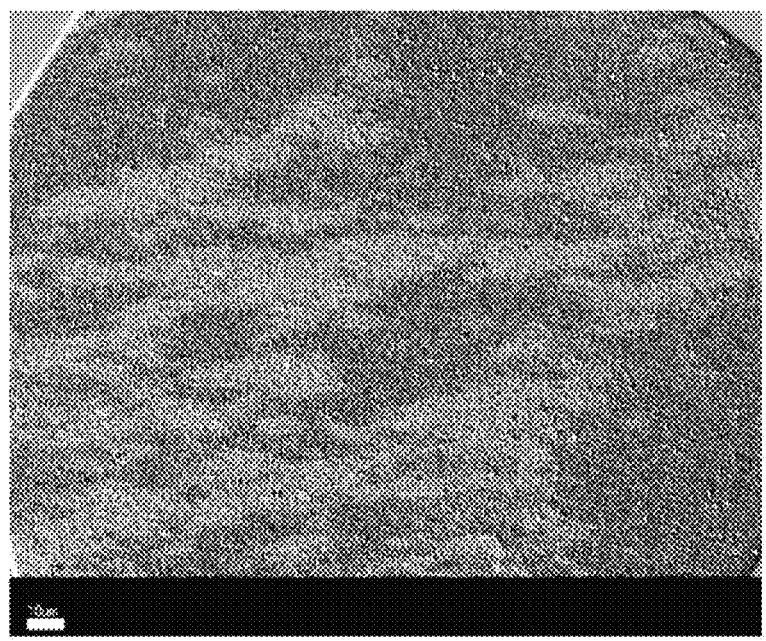

In addition, FIG. 11 is diagram illustrating a result in which a random magnetization arrangement is confirmed using an MOKE, FIG. 12 is a diagram illustrating a white box of FIG. 11. FIG. 13 is a diagram illustrating a blue box of FIG. 11. FIG. 14 is a diagram illustrating a red box of FIG. 11.

It can be seen that, in absence of the external magnetic field, the random magnetization arrangement is separated into domains, each having a size of several tens of μm, and each region has exchange coupling anisotropy in the opposite orientation.

More specifically, it can be seen that the magnetization distribution is random as shown in FIGS. 15 to 18. That is, the domain size is randomly distributed in the range of several tens of μm to several hundreds of μm in a magnetic thin film.

Figure 19:
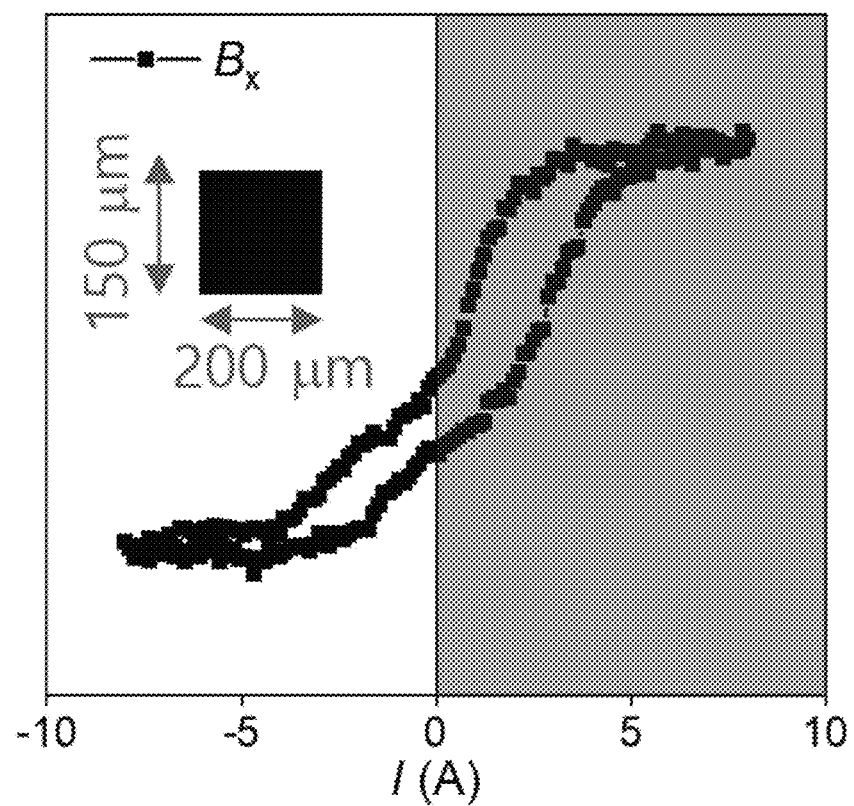
FIG. 19 is a diagram illustrating local hysteresis.

Local hysteresis is shown as in FIG. 19, and it was confirmed that when a (+) magnetic field was applied and a (−) magnetic field was applied, the distribution was the same as in FIG. 11. From the above description, stability due to the exchange coupling with respect to the external magnetic fields due to the exchange coupling can be confirmed.

Next, it was confirmed reconfigurability of the demagnetization process performed on the triple-layered structure in which the non-magnetic layer 20 and the upper ferromagnetic layer 30 were bonded to the above-described antiferromagnetic layer and the above-described ferromagnetic layer.

Figure 20:
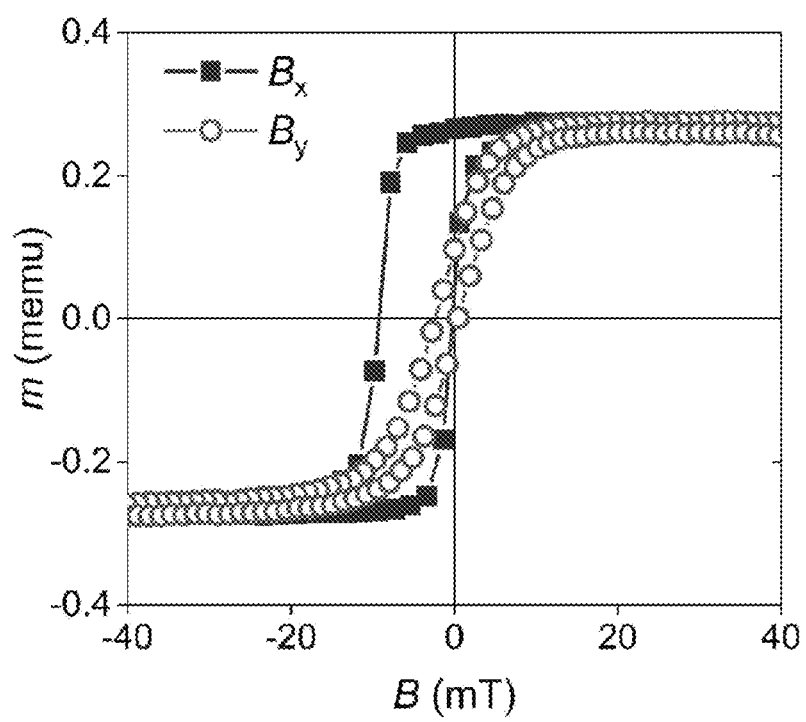
FIGS. 20 and 21 are diagrams illustrating a distribution of the lower ferromagnetic layer and a distribution of an upper ferromagnetic layer before demagnetization, respectively.
Figure 21:
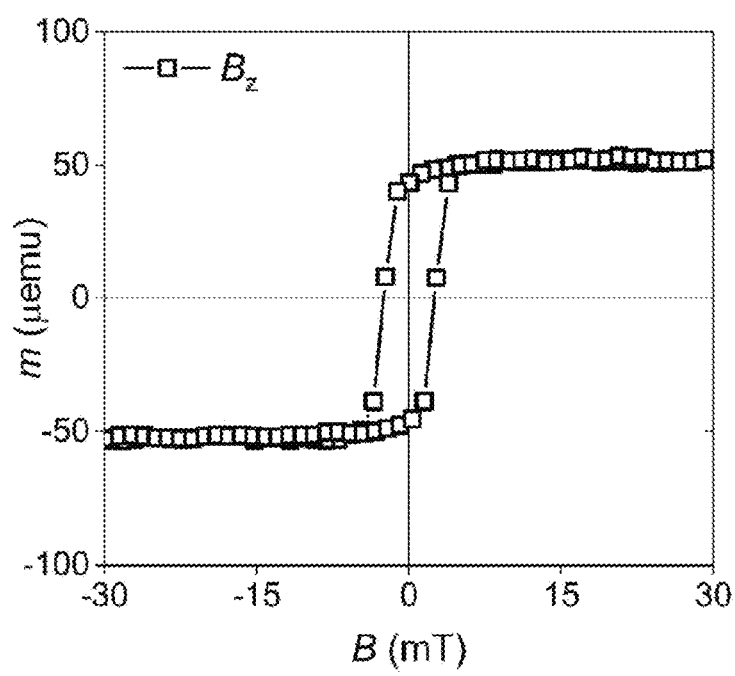
Figure 22:
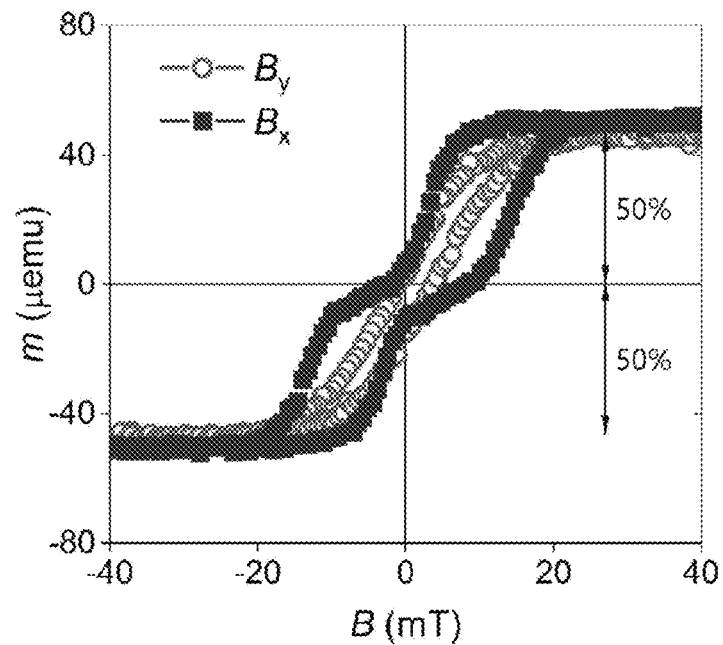
FIGS. 22 and 23 are diagrams distribution illustrating a distribution of the lower ferromagnetic layer and a distribution of an upper ferromagnetic layer after demagnetization, respectively.
Figure 23:
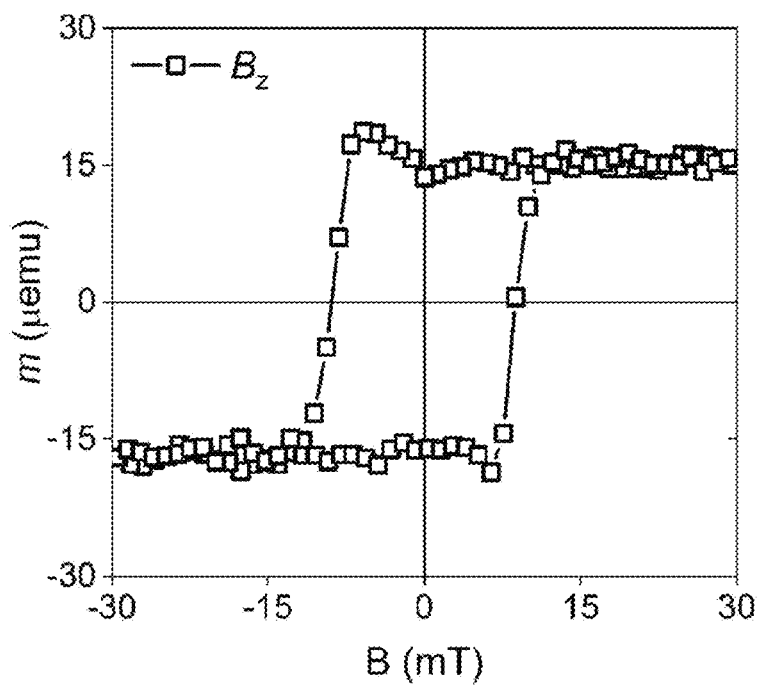
Figure 24:
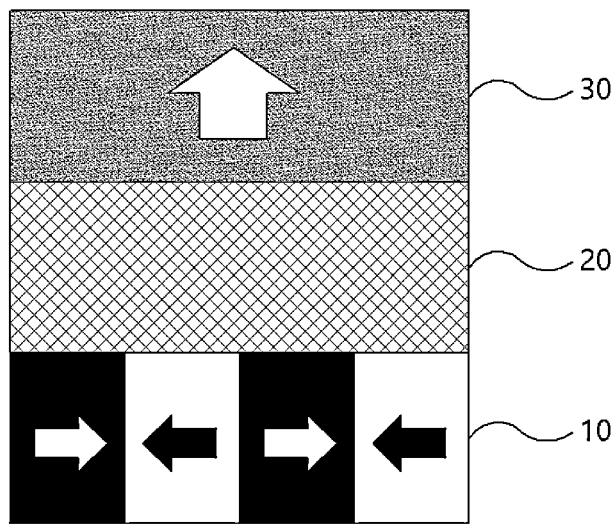
FIG. 24 is a mimetic diagram distribution variations of the lower ferromagnetic layer and the upper ferromagnetic layer after the demagnetization.

From the distributions of the lower ferromagnetic layer and the upper ferromagnetic layer before the demagnetization as shown in FIGS. 20 and 21, when the demagnetization was performed as shown in FIG. 22, distribution variations occurred in the lower ferromagnetic layer and the upper ferromagnetic layer after the demagnetization as shown in FIGS. 23 and 24.

It can be seen that an exchange bias of the lower ferromagnetic layer appears as 50:50, and the upper ferromagnetic layer is not affected by the demagnetization process.

Figure 25:
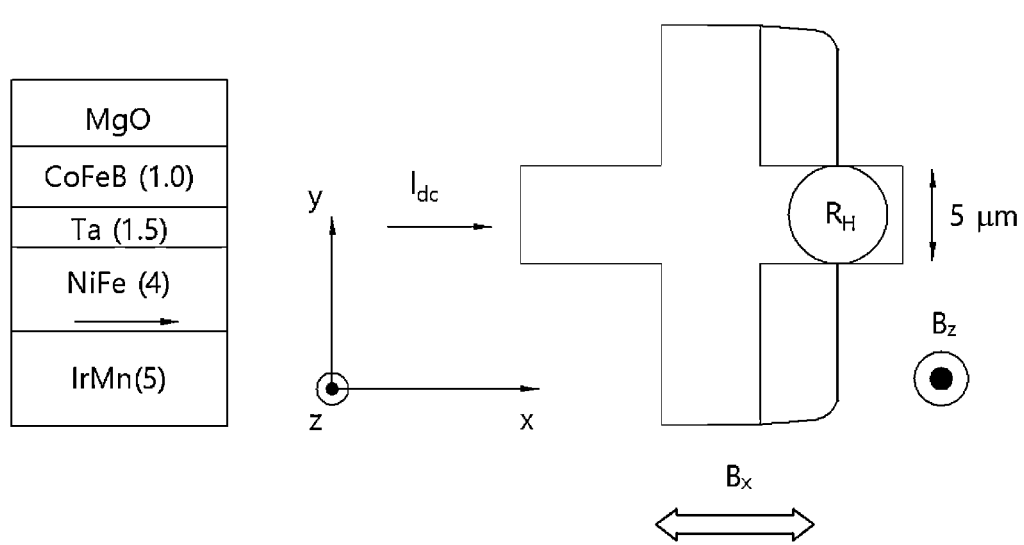
FIG. 25 is a diagram illustrating an example in which a device structure of the present disclosure is formed as an array, 35 μm×5 μm Hall bar is patterned, and then Hall resistance (RH) is measured by applying a current in an x-orientation.

Next, as described above, a device structure of the present disclosure as shown in FIG. 25 was formed as an array, 35 μm×5 μm Hall bar was patterned, and then Hall resistance (RH) was measured by applying a current in the x-orientation.

Figure 26:
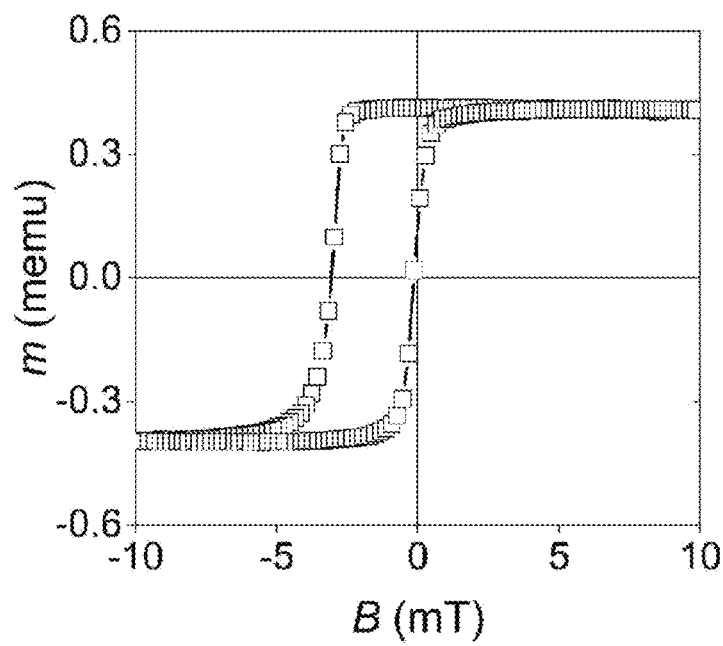
FIG. 26 is a diagram illustrating a vibrating sample magnetometer (VSM) measurement result of the experiment of FIG. 25.
Figure 27:
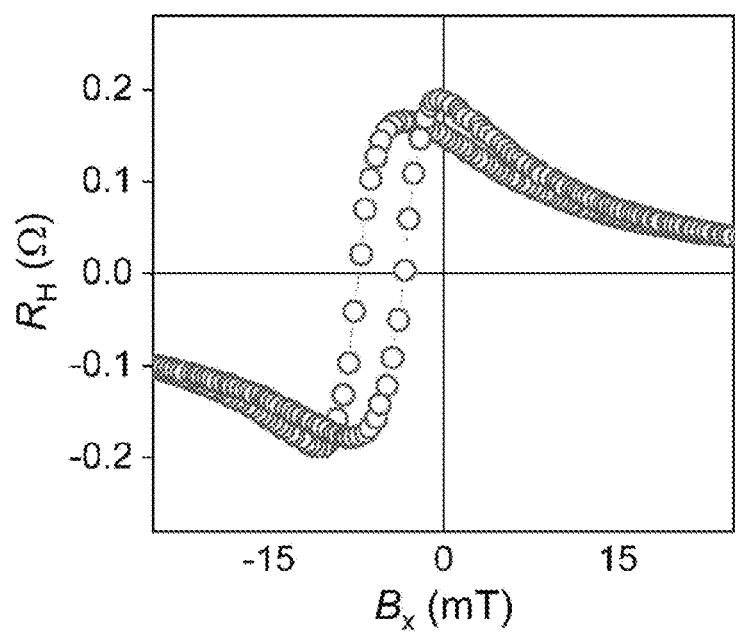
FIG. 27 is a diagram illustrating an RH result with respect to Bx of the experiment of FIG. 25.
Figure 28:
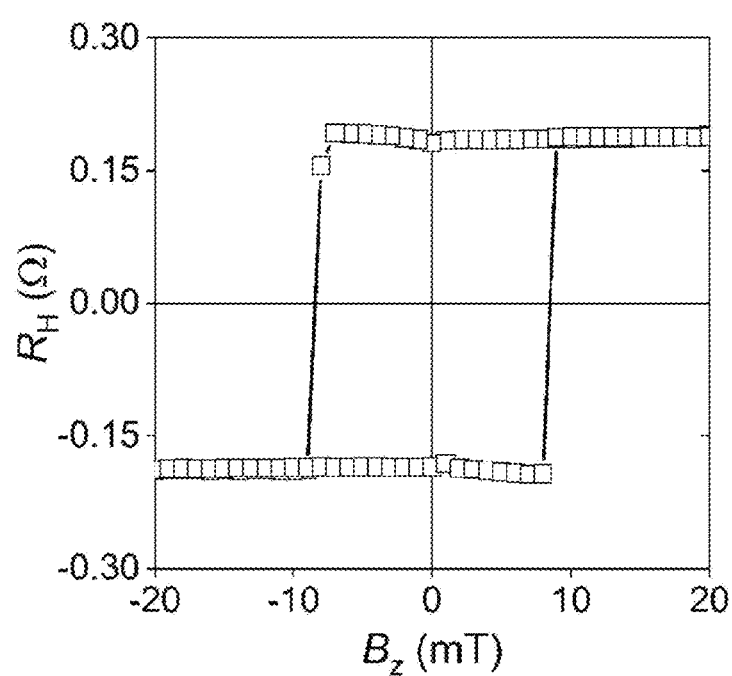
FIG. 28 is a diagram illustrating an RH result with respect to Bz of the experiment of FIG. 25.

FIG. 26 illustrates a VSM measurement result, and FIG. 27 illustrates an RH result with respect to Bx. Through the above results, the exchange coupling anisotropy can be confirmed even in the patterned device. FIG. 28 illustrates an RH result with respect to Bz. Through the result, Hall can be confirmed due to a vertical CoFeB in the patterned device.

Figure 29:
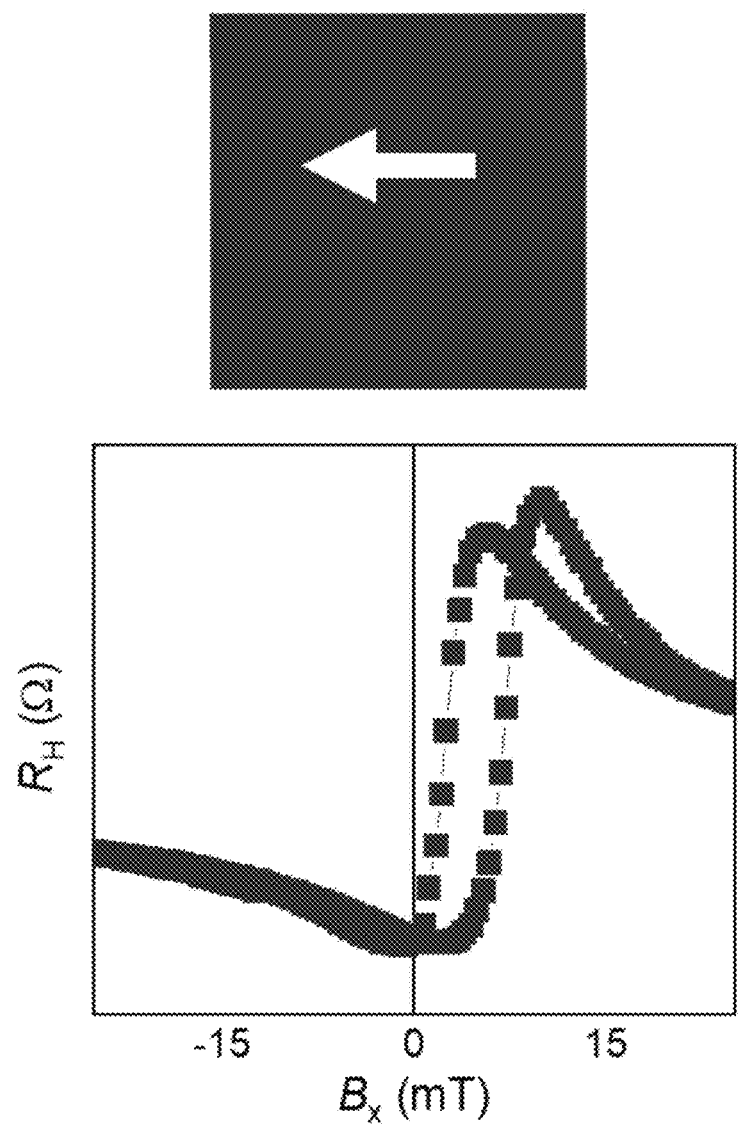
FIGS. 29, 30, 31, and 32 are diagrams illustrating results obtained by measuring orientation and distribution characteristics of randomly arranged magnetization patterns using planar Hall resistance.
Figure 30:
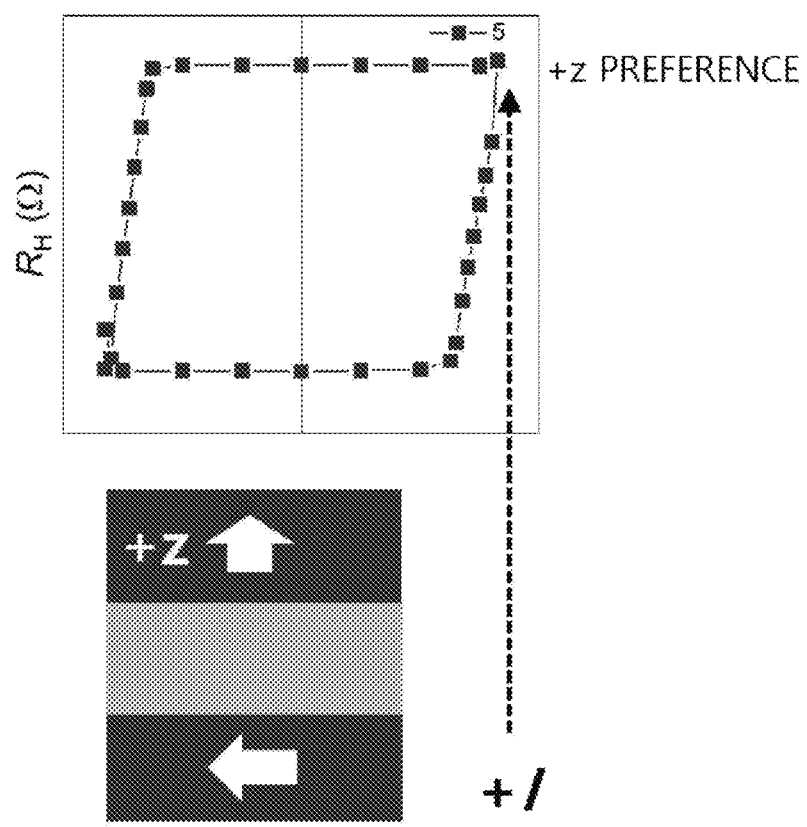
Figure 31:
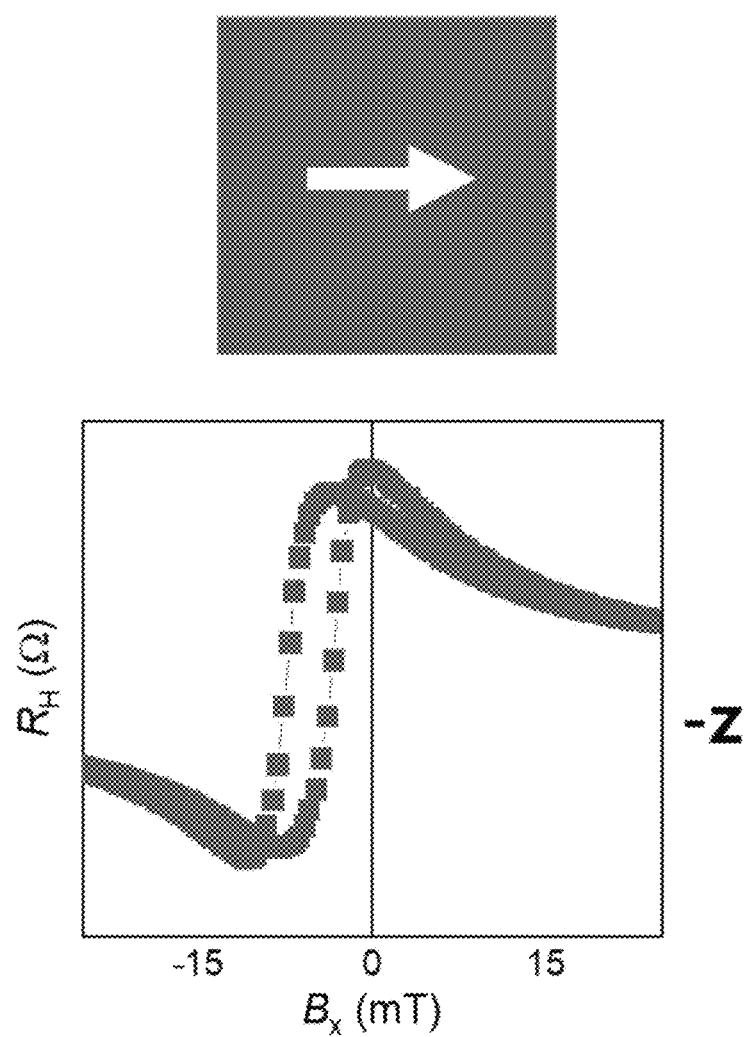
Figure 32:
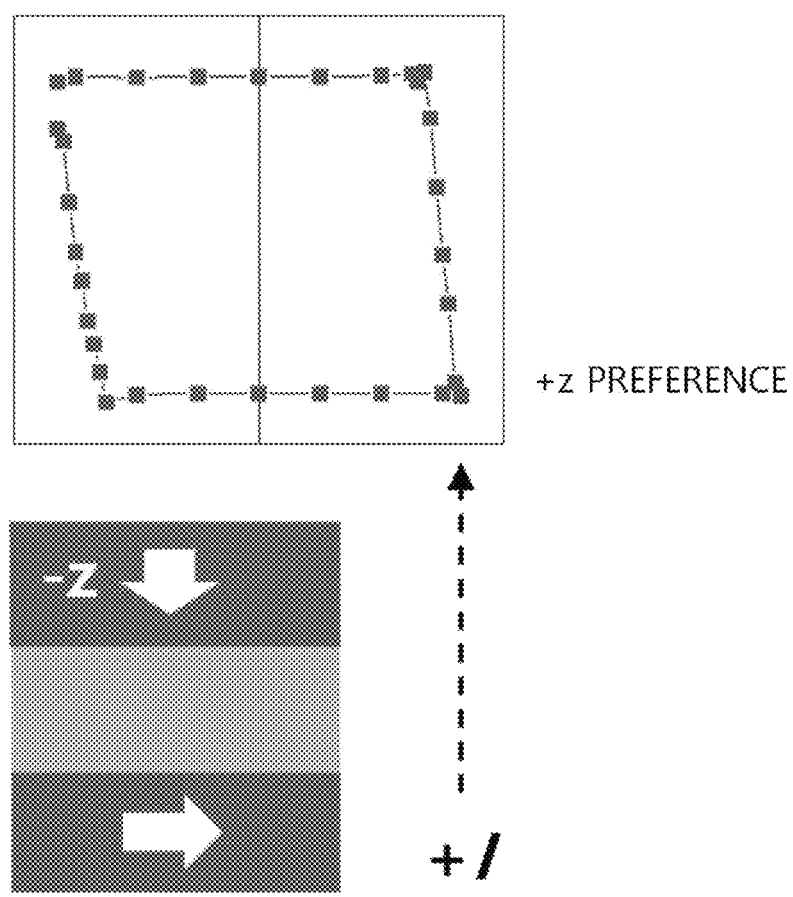

Next, as a result obtained by measuring orientation and distribution characteristics of the randomly arranged magnetization pattern using planar Hall resistance, from states shown in FIGS. 29 and 30, it can be seen that a $R_H$-$B_X$ orientation is shifted according to the exchange bias orientation of the lower ferromagnetic layer as shown in FIGS. 31 and 32.

That is, a preferred SOT switching orientation of the upper ferromagnetic layer is varied according to the magnetization orientation of the lower ferromagnetic layer.

Therefore, it is possible to store information as zero or one through SOT switching preference of the vertically magnetized upper ferromagnetic layer when the same current is applied. It is also possible to combine with an MTJ structure so as to increase a margin.

As described above, the spin-orbit torque device of the present disclosure is formed in a triple-layered structure of the lower ferromagnetic layer 10 having the horizontal anisotropy, the non-magnetic layer 20 bonded to the lower ferromagnetic layer 10, and the upper ferromagnetic layer 30 having the perpendicular anisotropy bonded to the non-magnetic layer 20, and the lower ferromagnetic layer 10 may be formed of the antiferromagnetic layer and the ferromagnetic layer.

Figure 33:
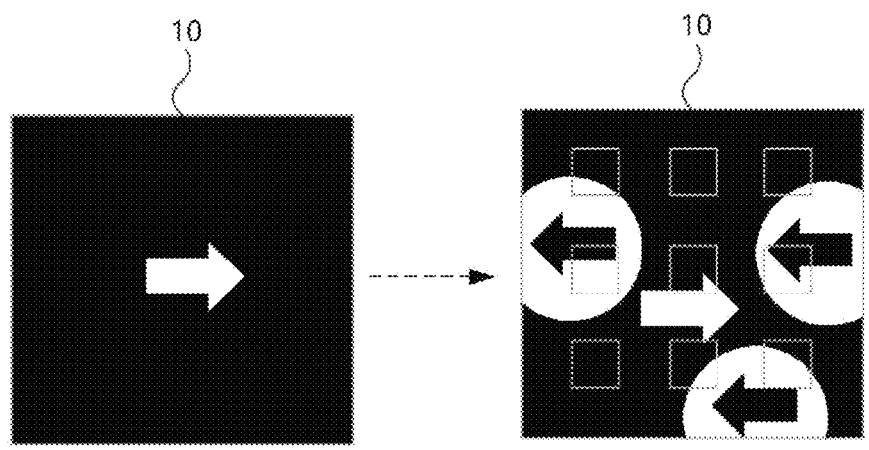
FIGS. 33 and 34 are diagrams illustrating a method of manufacturing a spin-orbit torque device and an array device according to the present disclosure.
Figure 34:
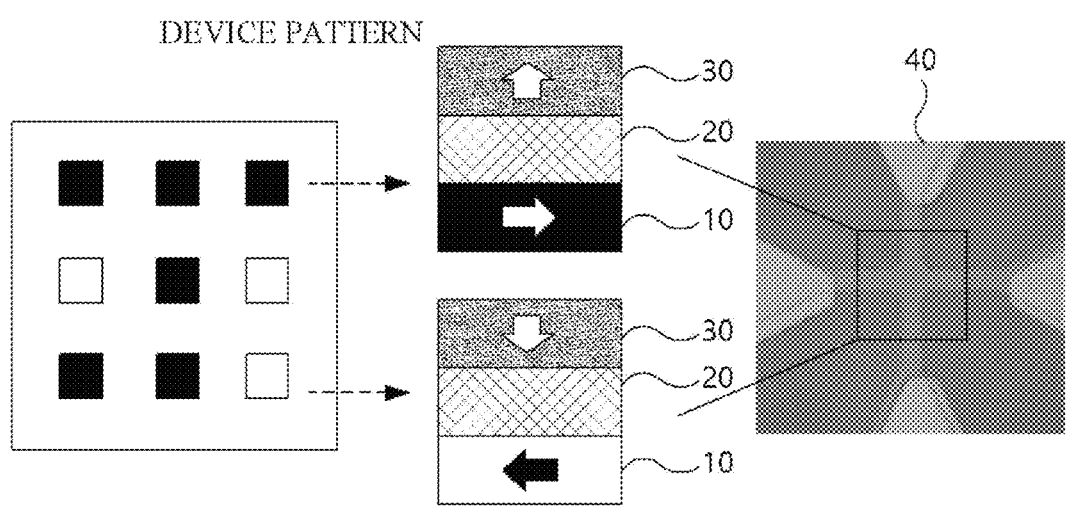

As shown in FIG. 33, in the triple layer of such a structure, the lower ferromagnetic layer 10 may be demagnetized, and as shown in FIG. 34, a switching device may be manufactured by performing patterning using etching and may be manufactured by being arranged the array device 40.

Meanwhile, in order to read each magnetization orientation, additional processes such as coating, exposing, and etching of another magnetic layer on the magnetic layer may be performed before and after the demagnetization process.

Figure 35:
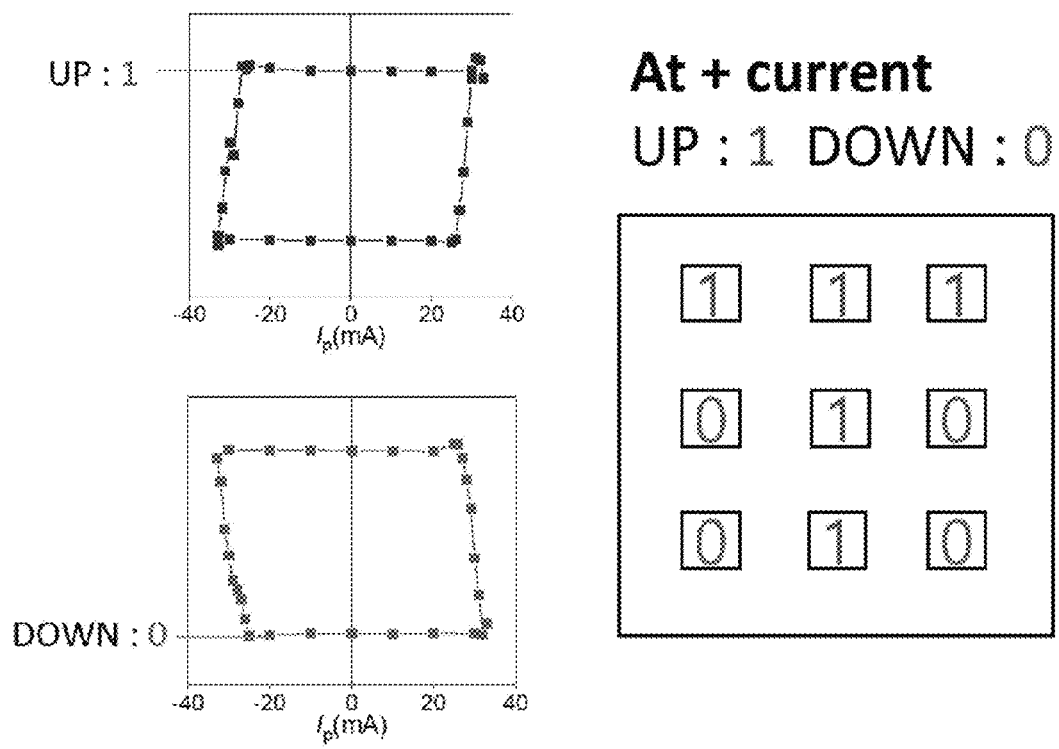
FIG. 35 is a diagram illustrating an example of an SOT PUF operation.
Figure 36:
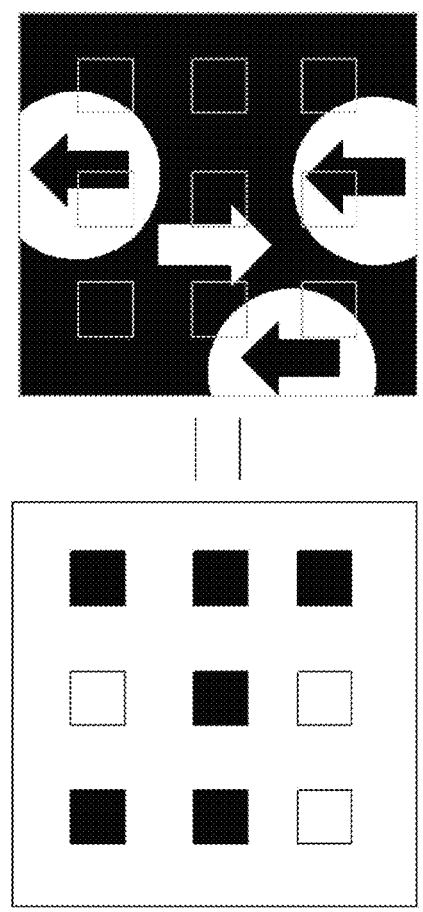
FIGS. 36, 37, and 38 are diagrams illustrating different magnetization distributions due to repeated demagnetization.
Figure 37:
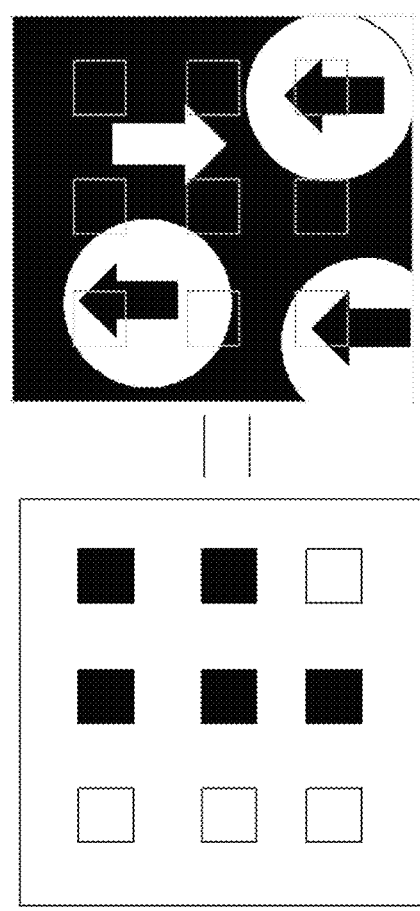
Figure 38:
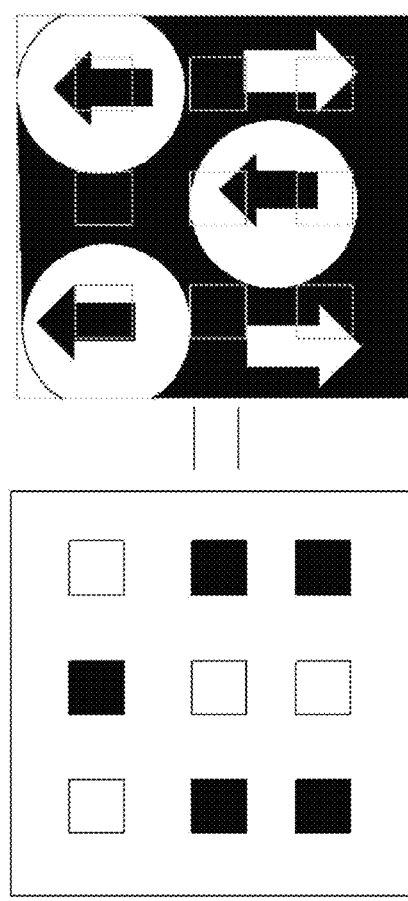

Consequently, the SOT PUF operation is possible as shown in FIG. 35, and different magnetization distributions are generated by repeated demagnetization as shown in FIGS. 36, 37, and 38 to have reconfigurability.

Such a random magnetization distribution is randomly arranged so that the distribution of magnetization is not the same every time the magnetization distribution is formed using the same method. Such randomness has a characteristic that is intentionally uncontrollable due to external process factors.

Therefore, on the basis of the characteristic, the spin-orbit torque device using the random magnetization orientation distribution of the present disclosure has reconfigurability.

The present disclosure is based on a random magnetization pattern which is generated during a demagnetization process of a magnetic thin film and is not controlled according to external factors.

Since the random magnetization arrangement formed using a method of the present disclosure is not the same in every operation, a device is manufactured using physical and chemical methods, and when the device is combined with a method of reading a magnetization orientation (or a characteristic dependent on the magnetization orientation) of each device using an electrical or optical method, the device can be applied as a hardware-based security device.

In addition, in order to protect each randomly distributed magnetization pattern from an external impact such as a magnetic field or heat, the magnetization orientation can be fixed using exchange coupling anisotropy, and a device using the random magnetization pattern generated through demagnetization of a thin film can be applied to applications related to an MTJ-based MRAM device, which is currently being developed, as well as various other magnetic material-based devices.

While the present disclosure has been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

The invention claimed is:

1. A spin-orbit torque for a physically unclonable functions (PUF) device, comprising:
   a lower ferromagnetic layer;
   a non-magnetic layer bonded to the lower ferromagnetic layer; and
   an upper ferromagnetic layer bonded to the non-magnetic layer;
   wherein the lower ferromagnetic layer has horizontal anisotropy and the upper ferromagnetic layer has anisotropy perpendicular to a plane direction of the upper ferromagnetic layer; and wherein a ratio of magnetic domains with a magnetization direction of +x and magnetic domains with a magnetization direction of -x formed within the lower ferromagnetic layer is 50:50.

2. The spin-orbit torque device of claim 1, wherein a switching polarity of the upper ferromagnetic layer is determined according to a random magnetization orientation of the lower ferromagnetic layer.

3. The spin-orbit torque device of claim 2, wherein each of the upper ferromagnetic layer and the lower ferromagnetic layer includes any one among a CoFeB alloy, a CoFe alloy, and a NiFe alloy.

4. The spin-orbit torque device of claim 3, wherein the non-magnetic layer includes any one of titanium (Ti) and tantalum (Ta).

5. A spin-orbit torque for a physically unclonable functions (PUF) device, comprising:
an antiferromagnetic layer;
a lower ferromagnetic layer bonded to the antiferromagnetic layer;
a non-magnetic layer bonded to the lower ferromagnetic layer; and
an upper ferromagnetic layer which is bonded to the non-magnetic layer and which has perpendicular anisotropy;
wherein a ratio of magnetic domains with a magnetization direction of +x and magnetic domains with a magnetization direction of -x formed within the lower ferromagnetic layer is 50:50; and
wherein exchange coupling anisotropy is formed between the antiferromagnetic layer and the lower ferromagnetic layer.

6. The spin-orbit torque device of claim 5, wherein the lower ferromagnetic layer is demagnetized.

7. The spin-orbit torque device of claim 6, wherein a switching polarity of the upper ferromagnetic layer is determined according to a random magnetization orientation of the lower ferromagnetic layer.

8. The spin-orbit torque device of claim 7, wherein:
each of the upper ferromagnetic layer and the lower ferromagnetic layer includes any one among a CoFeB alloy, a CoFe alloy, and a NiFe alloy; and
the antiferromagnetic layer includes any one of IrMn and PtMn.

9. A method of manufacturing a spin-orbit torque device, comprising:
preparing the spin-orbit torque device of claim 1; and
demagnetizing the lower ferromagnetic layer of the spin-orbit torque.

10. The method of claim 9, wherein the demagnetizing of the lower ferromagnetic layer includes:
heating the spin-orbit torque device; and
applying a magnetic field to the spin-orbit torque device.

11. The method of claim 10, wherein the heating of the spin-orbit torque device includes heating the lower ferromagnetic layer at a temperature that is greater than or equal to a Néel temperature of the lower ferromagnetic layer.

12. The method of claim 11, wherein the applying of the magnetic field includes alternating and applying a magnetic field to the spin-orbit torque device in an orientation opposite to a forward orientation by gradually reducing a magnitude of the magnetic field.

* * * * *